Figure 1:
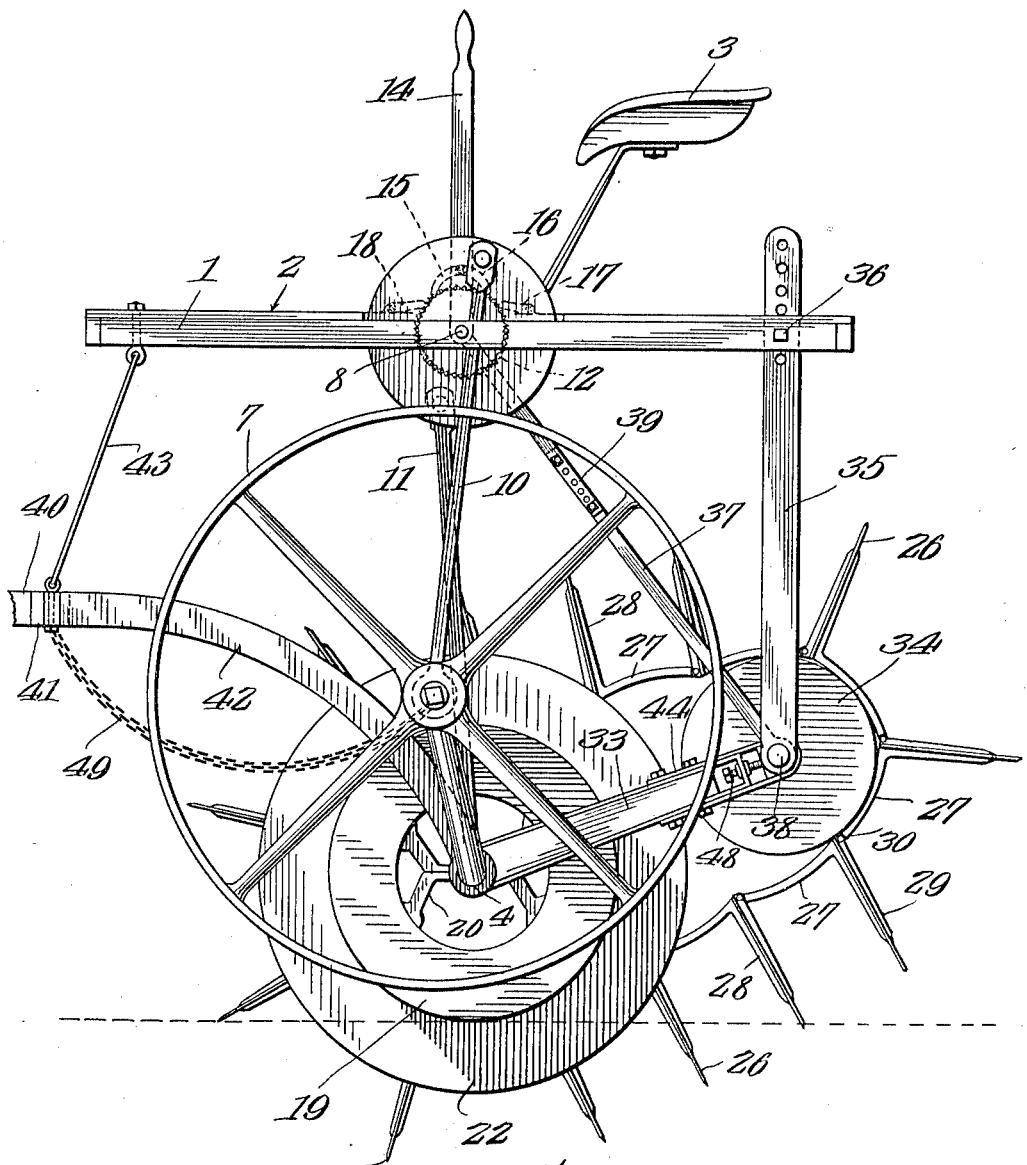

G. A. MATHESON.
MACHINE FOR TURNING OVER GROUND.
APPLICATION FILED APR. 27, 1912.

1,073,999.

Patented Sept. 23, 1913.
4 SHEETS—SHEET 1.

G. A. Matheson
INVENTOR,

WITNESSES

BY

ATTORNEY.

G. A. MATHESON.
MACHINE FOR TURNING OVER GROUND.
APPLICATION FILED APR. 27, 1912.
1,073,999.
Patented Sept. 23, 1913.
4 SHEETS—SHEET 2.
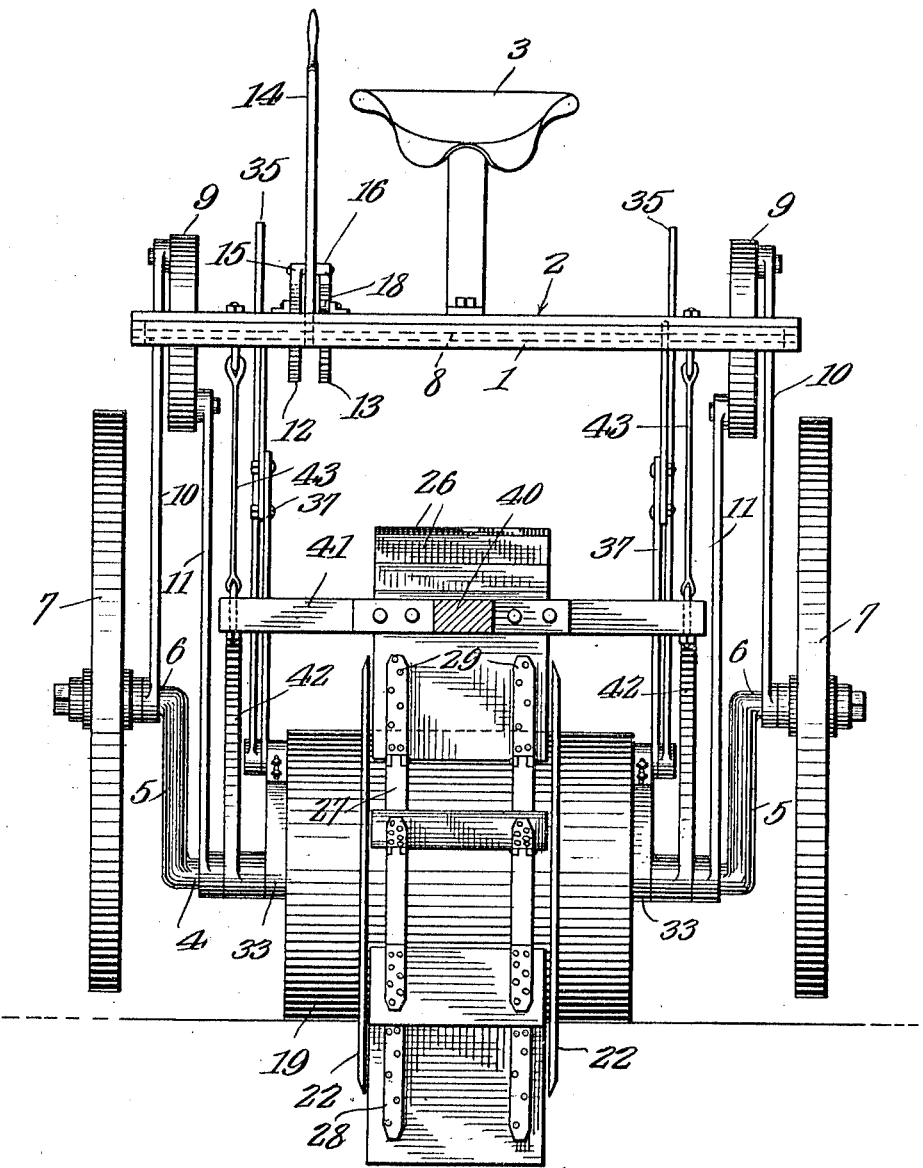

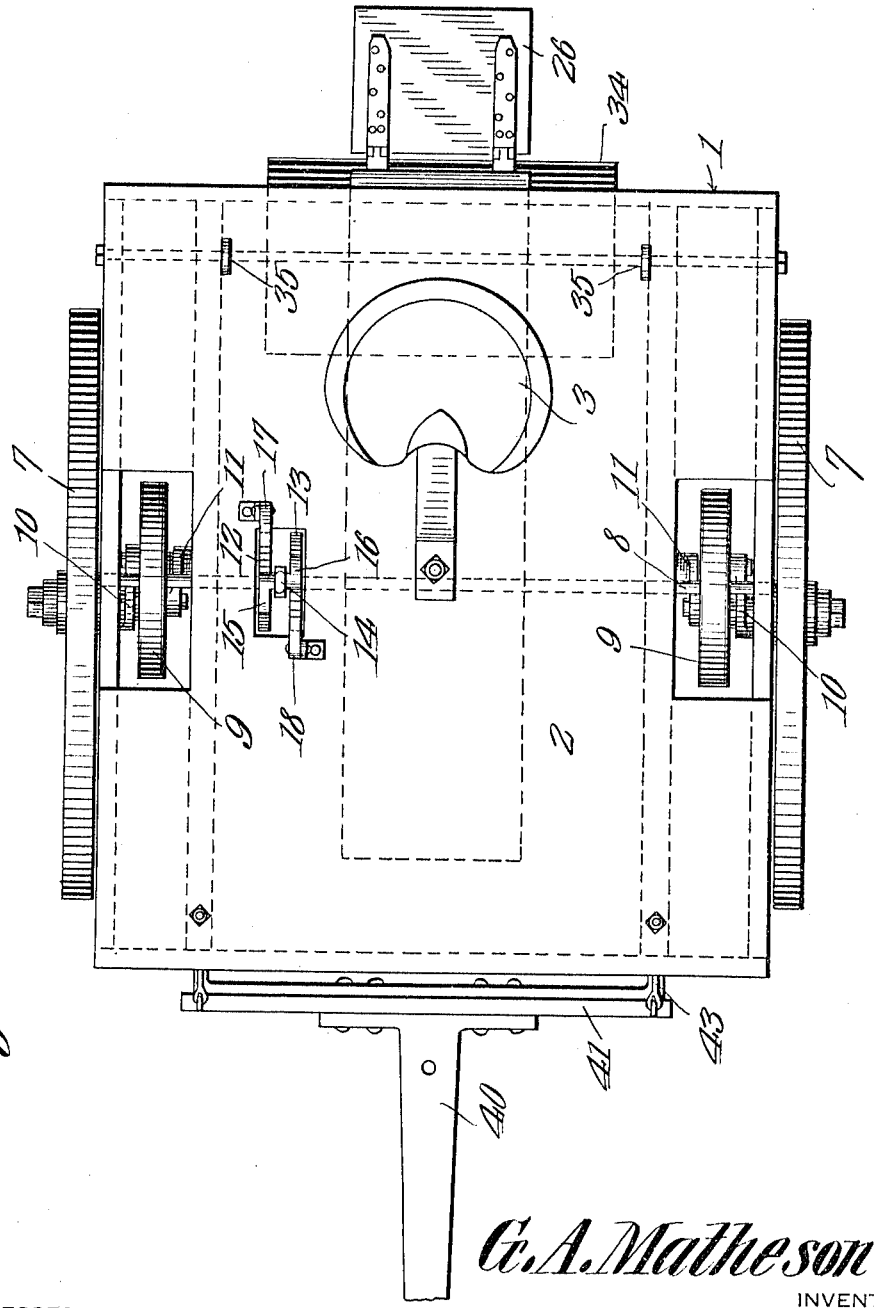

G. A. MATHESON.
MACHINE FOR TURNING OVER GROUND.
APPLICATION FILED APR. 27, 1912.
1,073,999.
Patented Sept. 23, 1913.
4 SHEETS—SHEET 4.
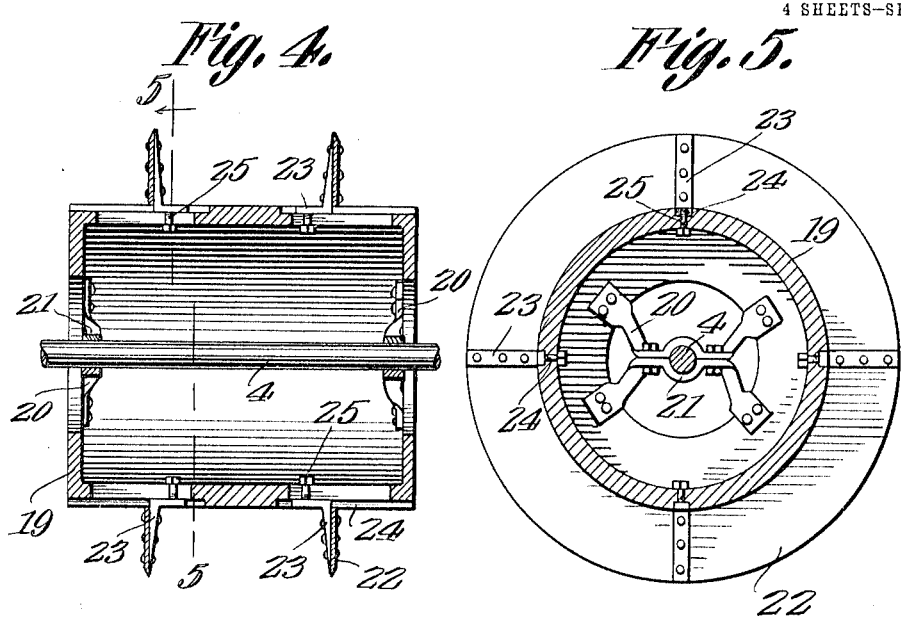
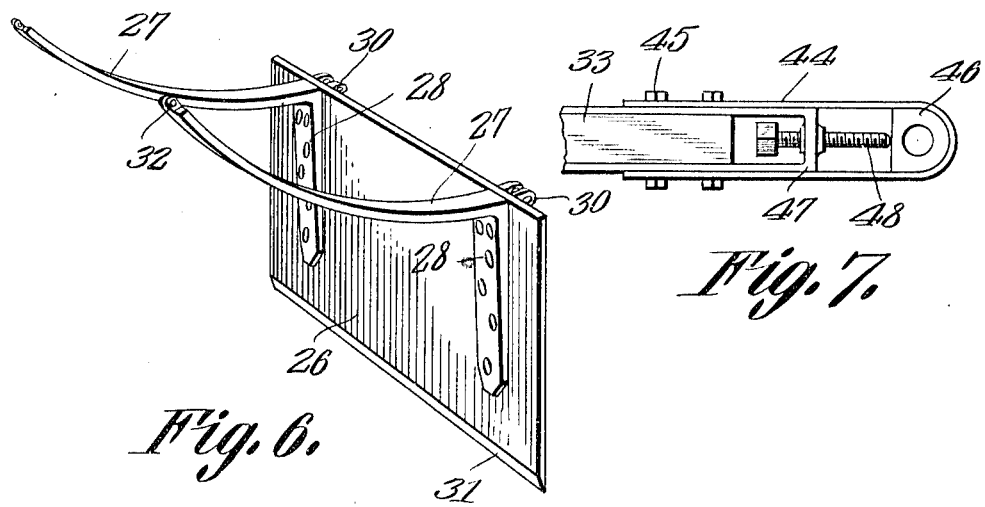

UNITED STATES PATENT OFFICE.

GEORGE A. MATHESON, OF VANCOUVER, BRITISH COLUMBIA, CANADA.

MACHINE FOR TURNING OVER GROUND.

1,073,999.  Specification of Letters Patent.  Patented Sept. 23, 1913.

Application filed April 27, 1912. Serial No. 693,537.

*To all whom it may concern:*

Be it known that I, GEORGE A. MATHESON, a citizen of the United States, residing at Vancouver, in the Province of British Columbia and Dominion of Canada, have invented a new and useful Machine for Turning Over Ground, of which the following is a specification.

This invention has reference to improvements in machines for turning over ground, and its object is to provide a machine whereby the ground over which it passes is disintegrated to an extent without the turning back of sod as occurs with a plow, and wherein the pull on the team is reduced and the team has a certain leverage which facilitates the turning over of the ground.

In accordance with the present invention there is provided a chain or belt of blades extending laterally with reference to the direction of draft and which are in part carried by a roller designed to engage the ground and wholly support the weight of the machine, while the belt or chain of blades or cutters is further carried by another roller which may be utilized to an extent for pulverizing the turned over ground when located in suitable relation to the ground, the second roller being in trailing relation to the first roller. Moreover, the machine is provided with means whereby the first roller, together with the blades or cutters, may be moved to an inactive elevated position with reference to the ground, under which conditions the machine is supported upon wheels permitting the transportation of the machine from place to place without bringing the blades or cutters into service. Furthermore, no driving gearing or connections of any kind are necessary for the operation of the blades, this being performed solely by the drawing of the machine over the ground, the weight of the machine forcing the blades into the ground and the progress of the machine causing the loosening up of the dirt and the turning over of the same.

The invention will be best understood from a consideration of the following detailed description taken in connection with the accompanying drawings forming a part of this specification, with the further understanding that while the drawings illustrate a practical form of the invention the latter is by no means confined to any strict conformity with the showing of the drawings, but may be changed and modified within such limits as do not mark any material departure from the salient features of the invention.

In the drawings:—Figure 1 is a side elevation of the machine embodying the present invention. Fig. 2 is a front elevation with the draft pole in section. Fig. 3 is a plan view of the machine. Fig. 4 is an axial diametric section of the blade carrying drum. Fig. 5 is a section on the line 5—5 of Fig. 4. Fig. 6 is a perspective view of one of the blades for acting on the ground with the links carrying and individual to the blade. Fig. 7 is a detail view of an adjusting device for tensioning the series of blades.

Referring to the drawings there is shown a frame 1 which may be of any suitable construction, being made up of longitudinal and cross beams and an appropriate amount of flooring 2. A seat 3 is carried by the ordinary spring standard mounted on the flooring 2 in appropriate position to accommodate the operator of the machine. There is provided a drop axle 4 having angle ends 5 each terminating in a spindle 6 upon which is mounted a wheel 7, the latter being of any suitable construction for the purpose, and the two wheels 7, one at each end of the axle, are designed to support the machine when being transported from place to place and when the ground overturning means is inactive.

Mounted on the frame 1 is a shaft 8 extending across the frame beneath the flooring 2 and carrying adjacent each end a disk 9. Connected to diametrically opposite points of the disk 9 are links 10, 11, respectively. The link 10 is connected to the disk on one face thereof, and the link 11 is connected to the disk on the opposite face thereof. Each link 10 extends to a respective one of the spindles 6 and each link 11 extends to the corresponding end of the main portion of the axle 4, the length of each angle portion 5 of the axle and the distance between the connections of the links 10 and 11 with the respective disk 9 are the same. Fast to the shaft 8 are two racks 12, 13, respectively, placed side by side and closely adjacent, while mounted on the shaft 8 as a support, but not connected therewith, is a manipulating arm or lever 14 carrying on opposite sides oppositely directed pawls 15, 16 in position to engage the respective racks 12 and 13, the spacing between said racks being sufficient to accommodate the lever 14. Each rack is also under the control of a respective pawl 17 or 18, as the case may be. The flooring 2 is cut away to permit the projection of the racks 12 and 13 therethrough, and the pawls 15 and 16, 17 and 18 are located above the flooring, while the teeth of the racks 12 and 13 are oppositely directed. The lever 14 is within ready reach of an operator supported by the seat 3 and by a proper manipulation of the lever 14 one or the other of the racks is turned in a corresponding direction, the shaft 8 participating in such turning movement, and under these circumstances a proper one of the pawls 17 and 18 is moved out of operative relation to the respective rack, so as not to interfere with its movement, such pawls acting as back stop pawls, while the pawls 15 and 16 are the actuating pawls. By the manipulation of the lever 14 the axle 4 is moved about an axis about intermediate of the distance between the main body of the shaft and the spindles 6 for a purpose to be described.

Mounted on the main portion of the shaft 4 is a roller 19, this roller being provided with arms 20 joined together and formed into journal bearings 21 embracing the axle 4 so that the roller may turn on the axle. Mounted on the roller are annular cutters 22 secured to angle arms 23 which in turn are lodged in grooves 24 in the periphery of the roller, and extending lengthwise thereof, these angle arms being held in the grooves in adjusted positions by set screws 25, or by any other suitable means. Each cutter 22 is provided with a suitable number of supporting arms or brackets 23, and may be adjusted in the direction of the longitudinal axis of the axle 4, so that the cutters may be separated to substantially the full length of the roller or brought to some position of less separation than the length of the roller, as may be desired.

Adapted to the periphery of the roller is a series of blades 26, one of which is shown separately in Fig. 6, and each blade has secured to it at spaced points curved links 27, each ending in an angle extension 28 which may be riveted or otherwise secured to one face of the blade, while to the other face thereof there is secured a member 29 similar to the angle extension 28, and which may be secured to the blade by the same rivets that serve to secure the link 27 to the blade. Each member 29 terminates in eyes 30 adjacent that edge of the blade to which the links 27 are secured, while the corresponding other edge of the blade is sharpened, as indicated at 31. Each link 27 terminates in an ear 32 adapted to enter between the eyes 30, and a suitable pivot pin traversing the eyes 30 and the intermediate ear serves to connect each link 27 of one blade with the next adjacent blade, so that the series of blades is in the form of an endless chain. The curvature of the links 27 is such as to conform with the curvature of the peripheral portion of the drum or roller 19, and when the chain of blades is upon the roller 19 the individual blades project in a direction substantially radial to the roller. The cutters 22 are in operation arranged closely adjacent to the ends of the blades 26 and the axial adjustment of the cutters 22 provides for the employment of chains of blades of different lateral extents, so that without any change in the structure of the machine a series of long blades 26 may be used, or a series of short blades may be used as may be found most desirable.

Connected to the main body of the axle 4 at opposite ends of the roller 19 are links 33, these links being extended toward the rear of the machine, considering the direction of active travel, and at the rear ends these links carry a roller 34 about which the chain of blades 26 travel. The roller 34 is further carried by supporting bars 35 at the ends of the roller, and these bars extend through the frame 1 where they may be supported by bolts or pins 36 and by providing bars 35 of sufficient length with more than one hole for the passage of a pin 36 the height of a roller 34 with respect to the level of the ground being operated upon is readily adjusted. To further support the roller 34 straps 37 are provided extending from the arbor of the roller 34, which arbor is indicated at 38, to the shaft 8, and the straps may be intermediately divided as indicated at 39 for lengthwise adjustment to accommodate different effective lengths of the bars 35.

In order to apply power to the machine by a team of draft animals, there is provided a pole 40 made fast to a cross beam 41 forming the intermediate portion of a yoke having legs 42 with their free ends provided with journals embracing the main body of the axle 4 on opposite sides of the roller 19, wherefore in operation the draft is applied directly to the roller. The intermediate member 41 of the yoke is supported at opposite ends by links 43 dropping from the main frame 1.

In order to determine the degree of tension of the chain of blades 26, each arm 33 has at one end an adjustable strap 44, shown best in Fig. 7, and this strap is held in place by bolts 45 which may be loosened and tightened at will. The strap carries a block 46 adapted to form a journal support for the arbor 38, and in order to readily adjust the effective length of each link 33 the end of the link carries a strap 47 in fixed relation to the link 33, and this strap in turn carries an adjusting screw 48 with which, by means of a suitable tool, any desired degree of stress may be placed upon the chain of blades by suitable effective lengthening of the links 33. A chain 49 extending from the cross beam 41 to each spindle 6 may be employed to take care of the drag of the wheels 7 when supporting the machine during transportation, and to relieve the dogs or pawls 17 and 18 from such load.

Let it be assumed that the roller 19 is resting on the ground and that a proper width of chain of blades is provided in accordance with the character of the ground to be treated, narrow blades being used for hard ground and wide blades for soft ground. As the machine is hauled over the ground the roller 19 will roll along the surface of the ground and force the blades 26 in succession into the ground, the weight of the roller and of the entire machine being amply sufficient for this purpose. As each blade enters the ground it constantly changes position with relation to the ground, thus tending to displace the ground more or less and to ultimately overturn the ground as the blade emerges, this tendency being regulated by the height of the roller 34 from the surface of the ground, and if the roller 34 be brought quite close to the ground it will serve as an efficient pulverizer. While the roller 19 is moving along the ground the cutters 22 are forced into the ground on opposite sides of the blades 26, and hence the sod is cut on both sides of the blades, thus contributing to the thorough turning over of the ground.

When it is desired to transport the machine from place to place without attacking the ground the lever 14 is manipulated as before described, thus raising the roller 19 from the ground to an extent which will prevent the blade 26 from entering the ground at all, and at the same time the wheels 7 are moved into engagement with the ground in position to support the entire machine and as there is nothing to cause a turning of the roller 19, the blades 26, as well as the rollers 19 and 34, remain quiescent. The action of the blades upon the ground is due to the engagement of the blades with the ground and the progressive movement of the machine which causes each blade to enter the ground at an angle with the blade directed forwardly, and to leave the ground with the blade at an angle and directed backwardly, thus causing the blade to move through a considerable arc, while in the ground, thereby thoroughly stirring up and overturning the ground where engaged by the blade, and this occurs with each blade in succession. Practice has demonstrated that the effect described is produced and that the load on the draft animals is small as compared with other means for overturning ground.

The blades on entering the ground have an angular movement with reference to an advancing axis of rotation and then are drawn from the ground in the direction substantially that of the plane of the blades, but the blade during its withdrawing movement participates in the forward movement of the machine and hence tends to act upon the ground with its forward face to overturn that portion of the ground engaged thereby, while lifting action of the blade upon the ground during its withdrawal is avoided.

What is claimed is:—

1. In a machine for the purpose described, an endless series of connected flat spaced blades, and spaced roller supports for said series of blades, the spacing of the rollers being in the direction of active movement of the machine with the forward roller support constituting the sole sustaining means for the machine when in action, and the rear roller support being elevated from the ground.

2. In a machine for the purpose described, a ground roller having axially spaced annular cutters thereon, another roller disposed to the rear of the first roller with respect to the direction of travel of the machine, and an endless series or chain of blades extending between and encircling the rollers, the chain of blades encircling that portion of the first named roller between the annular cutters thereon.

3. In a machine for the purpose described, a ground roller having axially spaced annular cutters thereon, another roller disposed to the rear of the first roller with respect to the direction of travel of the machine, and an endless series or chain of blades extending between and encircling the rollers, the chain of blades encircling that portion of the first named roller between the annular cutters thereon, said annular cutters being disposed axially of the roller carrying them.

4. In a machine for the purpose described, a ground roller, another roller to the rear thereof with respect to the direction of active travel of the machine, an endless connected series of spaced blades extending between and in encircling relation to the rollers, and a support for the second named roller adjustable to determine the distance of the second named roller from the ground.

5. In a machine for the purpose described, a ground roller having axially spaced annular cutters thereon, another roller disposed to the rear of the first roller with respect to the direction of travel of the machine, and an endless series or chain of blades extending between and encircling the rollers, the chain of blades encircling that portion of the first named roller between the annular cutters thereon, said annular cutters being adjustable axially of the roller carrying them, and the second named roller being connected to the first named roller by links provided with means for changing their effective length.

6. In a machine for the purpose described, an endless series of blades each having extended curved links attached to one face and eyes attached to the other face to receive the links of an adjacent blade.

7. In a machine for the purpose described, an endless series of blades each having extended curved links attached to one face and eyes attached to the other face to receive the links of an adjacent blade, the machine being provided with a ground roller of a curvature conforming to the curvature of the links.

8. In a machine for the purpose described, a ground roller, a series of blades adapted to in part encircle the ground roller, and cutters carried by the ground roller on opposite sides of the path of the blades about said roller.

9. In a machine for the purpose described, a ground roller, a series of blades adapted to in part encircle the ground roller, and cutters carried by the ground roller on opposite sides of the path of the blades about said roller, the roller and cutters having coacting means for the adjustment of the cutters axially of the roller to accommodate blades of different widths.

10. In a machine for the purpose described, a ground roller, another roller arranged to the rear of the first named roller with respect to the active direction of travel of the machine, an adjustable mounting for the second roller to regulate its height above the ground, and an endless series of blades extending between and around both rollers, the second named roller being movable by means of the adjustable mounting into position to operate as a pulverizing roller for ground turned over by the blades.

In testimony that I claim the foregoing as my own, I have hereto affixed my signature in the presence of two witnesses.

GEORGE A. MATHESON.

Witnesses:
FRANK JAKO,
A. E. CARLSON.

---

Copies of this patent may be obtained for five cents each, by addressing the "Commissioner of Patents, Washington, D. C."